US012397851B2

(12) United States Patent
Doerner

(10) Patent No.: US 12,397,851 B2
(45) Date of Patent: Aug. 26, 2025

(54) METHOD FOR STEERING A VEHICLE, ACTUATOR FOR REAR AXLE STEERING SYSTEM OF A VEHICLE AND REAR AXLE STEERING SYSTEM HAVING SUCH AN ACTUATOR

(71) Applicant: Schaeffler Technologies AG & Co. KG, Herzogenaurach (DE)

(72) Inventor: Christian Doerner, Sugenheim (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 546 days.

(21) Appl. No.: 17/802,201

(22) PCT Filed: Feb. 8, 2021

(86) PCT No.: PCT/DE2021/100116
§ 371 (c)(1),
(2) Date: Aug. 25, 2022

(87) PCT Pub. No.: WO2021/175361
PCT Pub. Date: Sep. 10, 2021

(65) Prior Publication Data
US 2023/0339536 A1 Oct. 26, 2023

(30) Foreign Application Priority Data

Mar. 4, 2020 (DE) ..................... 10 2020 105 797.0

(51) Int. Cl.
*B62D 5/04* (2006.01)
*B62D 7/15* (2006.01)

(52) U.S. Cl.
CPC ......... *B62D 5/0481* (2013.01); *B62D 5/0496* (2013.01); *B62D 7/15* (2013.01)

(58) Field of Classification Search
CPC ............................ B62D 5/0481; B62D 5/0496
See application file for complete search history.

(56) References Cited

U.S. PATENT DOCUMENTS 5,086,861 A * 2/1992 Peterson .............. B62D 7/1581
180/445
6,298,940 B1 10/2001 Bohner
(Continued)

FOREIGN PATENT DOCUMENTS

CN 1236717 A 12/1999
CN 102667099 A 9/2012
(Continued)

*Primary Examiner* — Valentin Neacsu
*Assistant Examiner* — Hosam Shabara
(74) *Attorney, Agent, or Firm* — Matthew V. Evans

(57) ABSTRACT

The disclosure relates to a method for steering a vehicle via a rear axle steering system that includes an actuator having a steering linkage at least indirectly operable by a threaded drive and longitudinally displaceable within a chassis-fixed housing. The actuator includes a rotor position sensor for detecting a rotor position of a rotor of an electric motor designed for actuating the threaded drive and a linear sensor for detecting an axial position of a target arranged on the steering linkage. The two sensors are connected to a control and analysis unit configured to carry out a comparison between the rotor position and the axial position of the target when there is a defined zero point of an axial position of the steering linkage relative to the housing and, in consideration of a thermal expansion of at least the steering linkage, operating the actuator to adjust the steering angle.

19 Claims, 1 Drawing Sheet

(56) References Cited

U.S. PATENT DOCUMENTS

| | | | | |
|---|---|---|---|---|
| 8,244,433 B2* | 8/2012 | Mitsuhara | ..........  | B62D 15/0215 |
| | | | | 701/41 |
| 11,267,509 B2* | 3/2022 | Buering | ............. | B62D 15/0225 |
| 2010/0030427 A1 | 2/2010 | Mitsuhara et al. | | |

FOREIGN PATENT DOCUMENTS

| | | | | |
|---|---|---|---|---|
| CN | 105416389 A | 3/2016 | | |
| CN | 107215385 A | 9/2017 | | |
| CN | 108367771 A | 8/2018 | | |
| CN | 109311506 A | 2/2019 | | |
| CN | 110550091 A | 12/2019 | | |
| CN | 110582441 A | 12/2019 | | |
| DE | 10164580 C1 | 4/2003 | | |
| DE | 10329293 A1 | 1/2005 | | |
| DE | 102004042243 B4 | 12/2008 | | |
| DE | 102011085607 A1 | 7/2012 | | |
| WO | WO-2012059511 A2 * | 5/2012 | ............. | B60G 7/006 |
| WO | 2015114256 A1 | 8/2015 | | |
| WO | 2018206295 A1 | 11/2018 | | |

\* cited by examiner

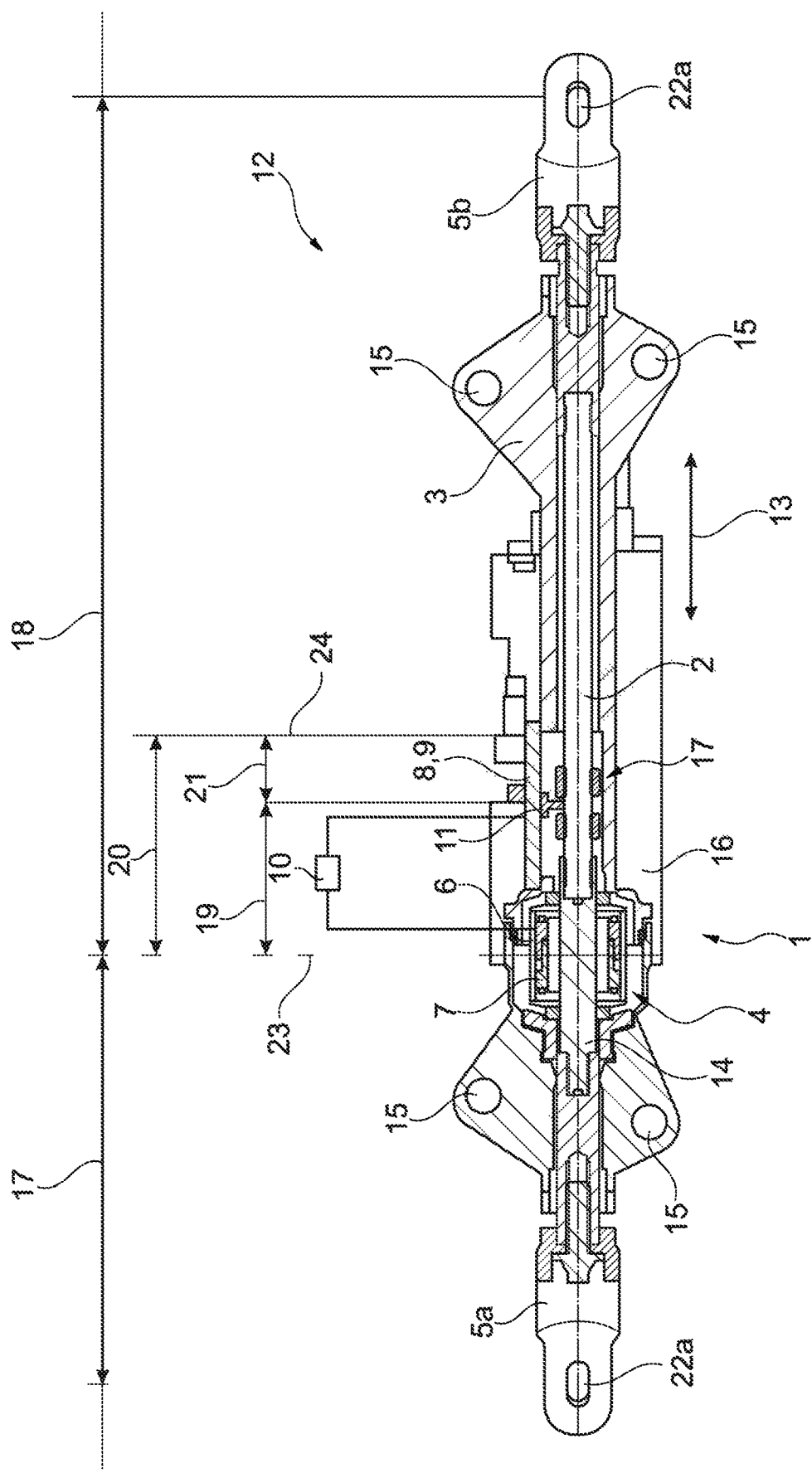

METHOD FOR STEERING A VEHICLE, ACTUATOR FOR REAR AXLE STEERING SYSTEM OF A VEHICLE AND REAR AXLE STEERING SYSTEM HAVING SUCH AN ACTUATOR

CROSS-REFERENCE TO RELATED APPLICATIONS

This application is the U.S. National Phase of PCT Application No. PCT/DE2021/100116 filed on Feb. 8, 2021, which claims priority to DE 10 2020 105 797.0 filed on Mar. 4, 2020, the entire disclosures of which are incorporated by reference herein.

TECHNICAL FIELD

This disclosure relates to a method for steering a vehicle by means of a rear axle steering system, wherein the rear axle steering system comprises an actuator with a steering linkage which is at least indirectly operable by a threaded drive and which is longitudinally displaceable within a chassis-fixed housing. The steering linkage can be used to adjust a steering angle of wheels at least indirectly connected thereto. The disclosure further relates to a rear axle steering system having such an actuator and to a vehicle comprising such a rear axle steering system or such an actuator.

BACKGROUND

WO 2018/206 295 A1 discloses a steering device for a vehicle with a steering rod and at least one drive unit, wherein the steering rod is displaceable in its longitudinal extension by means of the drive unit. Furthermore, at least one first sensor device is provided for determining a sliding position of the steering rod. Viewed in the longitudinal direction, the steering rod has at least one change in its cross section, in particular its diameter, wherein the first sensor device is designed to detect this change.

SUMMARY

The object of the present disclosure is to further develop a method for steering a vehicle and an actuator for a rear axle steering system of a vehicle.

This object is achieved by a method and an actuator described herein.

In a method according to the disclosure for steering a vehicle by means of a rear axle steering system, in which the rear axle steering system comprises an actuator having a steering linkage which is at least indirectly operable by a threaded drive and which is longitudinally displaceable within a chassis-fixed housing, wherein a steering angle of wheels that are at least indirectly connected to the steering linkage is adjusted by said steering linkage, the actuator comprising a rotor position sensor for detecting a current rotor position of a rotor of an electric motor designed for actuating the threaded drive and a linear sensor for detecting a current axial position of a target arranged on the steering linkage, at least the two sensors each being connected to a control and analysis unit, the control and analysis unit always carries out a comparison between the current rotor position of the rotor and the current axial position of the target when there is a defined zero point of an axial position of the steering linkage relative to the housing and, in consideration of a thermal expansion of at least the steering linkage, operates the actuator in order to adjust the steering angle.

The actuator is provided for adjusting a steering angle of vehicle wheels that are operatively connected to the actuator on a rear axle of the vehicle by axially displacing the steering linkage relative to the chassis-fixed housing. This, for example, initiates a cornering of the vehicle. The steering linkage consists of one or more thrust rods which are operatively connected to one another and which can have, at their free ends, a respective fork connection with a fork element, on which, at least indirectly, the respective vehicle wheel is accommodated. The steering linkage can thus be constructed in one or several parts and additionally has a threaded spindle which is connected to it in one or several parts and is arranged concentrically therewith.

The axially non-displaceable threaded nut is driven at least indirectly by the electric motor, with the threaded nut being operatively connected at least indirectly to the rotatably drivable rotor of the electric motor. The threaded nut is operatively connected to the threaded spindle and thus indirectly to the steering linkage. The threaded spindle, or the steering linkage, is set in a lengthwise displacement or in a longitudinal displacement relative to the housing or the threaded nut by a rotation of the threaded nut. The threaded spindle and the threaded nut thus form a threaded drive, wherein the rotary drive of the threaded nut causes a linear adjusting movement of the steering linkage for adjusting the steering angle of the vehicle wheels. Furthermore, the drive unit can comprise a transmission device which is designed, for example, as a belt transmission or as a planetary transmission and is operatively connected to the threaded nut. The threaded drive is designed in particular as a planetary roller threaded drive, in which a large number of planetary rollers are arranged spatially between the threaded nut and the threaded spindle, which transmit the forces between the threaded nut and the threaded spindle and vice versa and convert a rotational movement of the threaded nut into a longitudinal movement of the threaded spindle.

When the rear axle steering is in operation, it is not the actual steering angle of the vehicle wheels that is detected, but rather the axial position of the steering linkage relative to the housing. This is done using the target in conjunction with the linear sensor. However, the actual length of the steering linkage changes over a temperature curve, so that the actual or current steering angle does not always correspond to the target specification of the analysis and control unit. The housing of the actuator, the chassis of the vehicle, the threaded drive with the threaded spindle and the threaded nut, and other components of the vehicle are also subject to temperature-related deformations.

A material-specific coefficient of thermal expansion is known for each of these components, which can be determined separately and stored in a database of the analysis and control unit. Consequently, the analysis and control unit provides the known coefficients of thermal expansion of the components relevant to the steering of the vehicle, so that a temperature-related deformation behavior of the components can be derived for each current temperature. In addition, constraints within the components can be taken into account, for example due to tension caused by screwing the housing to the chassis of the vehicle.

During assembly of the rear axle steering, a zero point is determined or defined for the rotor position sensor and for the linear sensor. The zero point can be set at any desired point, wherein such a zero point is advantageous in that it is passed through or driven through as often as possible during operation of the rear axle steering. That axial position of the steering linkage in which the vehicle wheels are aligned in the direction of travel, i.e., straight ahead, is particularly suitable as the zero point. In other words, the zero point serves as a reference point in order to take into account a thermal expansion of at least the steering linkage for adjusting the steering angle of the vehicle wheels.

The rotor position sensor is independent of the thermal expansion of the steering linkage and can therefore determine the zero point of the system, regardless of temperature. The rotor position sensor is operatively arranged on the electric motor and is intended to determine an angle of rotation of the rotor of the electric motor. The rotor is arranged, for example, radially inside a stator of the electric motor, which is supplied with electrical energy to rotatably drive the rotor. A torque can be transmitted to the threaded nut by means of the rotor, which at least indirectly axially displaces the threaded spindle. The steering linkage is thus braced on the threaded drive, so that the expansion of the steering linkage on the threaded drive is equal to 0, wherein the steering linkage expands to the left and right when it heats up and thus lengthening it, and shortening it to the left and right when it cools down.

When the rear axle steering system is in operation, whenever the zero point is present, i.e., when the wheels are aligned straight ahead, for example, at least one signal is transmitted from the rotor position sensor about the current rotor position of the rotor, at least one signal is transmitted from the linear sensor about the current axial position of the steering linkage and at least one signal is transmitted about the current temperature to the analysis and control unit. Other signals can also be received by the analysis and control unit.

The thermal expansion of at least the steering linkage is can be determined by detecting current temperature data by means of at least one temperature sensor. In other words, at least one temperature sensor is provided on the vehicle, which is used to determine the current temperature, based on which the thermal expansion of at least the steering linkage or additional components relevant to the adjustment of the steering angle is determined. Based on this data and the constant comparison of the zero point between the rotor position sensor and the linear sensor, since the dimensions of the steering linkage, the housing, the threaded drive and other components as well as the associated material-dependent thermal expansion coefficients are known, the thermal expansion of the steering linkage can be calculated and taken into account for the operation of the rear axle steering system. In other words, depending on the thermal expansion, an actuation of the threaded drive can be adjusted in such a way that the actual steering angle of the vehicle wheels corresponds to a steering angle target specification of the analysis and control unit.

The respective temperature sensor can be integrated within the analysis and control unit. If, for example, the introduced power losses are determined by the control and analysis unit via a power integral, the control and analysis unit can use this to determine a current temperature, which in turn can be used to determine the thermal expansion of the steering linkage.

Alternatively or additionally, a temperature sensor is arranged on the linear sensor. As a result, the thermal expansion of the steering linkage can be determined comparatively precisely. Furthermore, alternatively or in addition, the respective temperature sensor is an outside temperature sensor. In addition, current temperature data can be used based on thermal information from surrounding actuators, such as a roll stabilizer or an e-axle of the vehicle. Consequently, the control and analysis unit can receive and further process temperature data from temperature sensors already located in the vehicle, as a result of which the rear axle steering system can be produced particularly cost-effectively.

According to one exemplary embodiment, the control and analysis unit carries out a comparison between the current rotor position of the rotor and the current axial position of the target per revolution of an electric motor at least indirectly driving the threaded nut and on the basis of which operates an actuator for adjusting the steering angle. This comparison is carried out in addition to the previously described zero point comparison, wherein the comparison per electric motor revolution takes place over the entire actuating path of the actuator, so that a temperature-dependent compensation of temperature-related differences in component dimensions can be carried out even more precisely by the analysis and control unit.

An actuator according to the disclosure for a rear axle steering system of a vehicle has a steering linkage which is at least indirectly operable by a threaded drive and which is longitudinally displaceable within a chassis-fixed housing. The steering linkage is designed to adjust a steering angle of wheels that are at least indirectly connected thereto. The actuator includes a rotor position sensor for detecting a current rotor position of a rotor of an electric motor designed for actuating the threaded drive and a linear sensor for detecting a current axial position of a target arranged on the steering linkage, at least the two sensors each being connected to a control and analysis unit. The control and analysis unit always carries out a comparison between the current rotor position of the rotor and the current axial position of the target when there is a defined zero point of an axial position of the steering linkage relative to the housing and, in consideration of a thermal expansion of at least the steering linkage, operating the actuator in order to adjust the steering angle.

The housing is connected to the chassis at two, or four or more points. As a result, constraints can arise within the housing when the temperature changes, which can be determined in advance by suitable simulations and are taken into account by the control and analysis unit.

Such an actuator can be used in a rear axle steering system of a vehicle according to the disclosure. The vehicle can have a plurality of rear axles, with one or more rear axles each having a respective rear axle steering system with a respective actuator. In addition, the vehicle can have at least one actuator according to the disclosure for adjusting a steering angle of the vehicle.

The above statements relating to the method apply equally to the actuator according to the disclosure and to the rear axle steering system and the vehicle.

BRIEF DESCRIPTION OF THE DRAWING

Further measures to improve the disclosure are further described below together with a description of example embodiments using a single FIGURE, whereby identical or similar components are marked with the same reference sign. The only FIGURE shows a longitudinal section through a rear axle steering system according to an example embodiment.

DETAILED DESCRIPTION

The single FIGURE shows a rear axle steering system 12 for a vehicle—not shown here—comprising an actuator 1 with a housing 3 in which a steering linkage 2 is guided longitudinally, i.e., in a displacement direction 13. The housing 3 is fixed at four fixed points 15 in relation to a chassis of the vehicle—not shown here. The steering linkage 2 is designed in several parts and comprises a threaded spindle 14, which is part of a threaded drive 4, wherein the threaded spindle 14 is operatively connected to a threaded nut 7 lying radially outside of it. The threaded nut 7 is supported axially relative to the housing 3 and can be rotatably driven by an electric motor 16, wherein, depending on the direction of rotation, a rotation of the threaded nut 7 is converted into an axial or longitudinal displacement of the threaded spindle 14 or the steering linkage 2 relative to the housing 3. By means of the axial displacement of the steering linkage 2, adjustments can be made in a steering angle of respective vehicle wheels—also not shown here—which are at least indirectly arranged on fork elements 5a, 5b of the rear axle steering system 12.

The actuator 1 also comprises a rotor position sensor 6 for detecting a current rotor position of a rotor of an electric motor 16 that is set up to actuate the threaded drive 4—not shown here—and a linear sensor 8 for detecting a current axial position of a target 11 arranged on the steering linkage 2, wherein, in addition to the linear sensor 8, a temperature sensor 9 for acquiring current temperature data is also arranged on the steering linkage 2. Alternatively, the temperature sensor 9 can also be arranged on the electric motor 16. The sensors 6, 8, 9 are each connected to a control and analysis unit 10. In the present case, the target 11 is arranged in an anti-rotation means 17 of the actuator 1, which prevents the steering linkage 2 from rotating about its own longitudinal axis, wherein the target 11 interacts with the linear sensor 8 to determine the axial position of the steering linkage 2 relative to the housing 3.

During assembly of the rear axle steering system 12, a zero point of the rotor position sensor 6 and the linear sensor 8 is defined in advance. In this case, for example, the distances between the fork elements 5a, 5b and the housing 3 are averaged out. The zero point is present, for example, when the vehicle wheels are aligned straight ahead, that is to say when the steering linkage 2 is in a specific axial position relative to the housing 3. This situation occurs comparatively frequently in the general operation of the rear axle steering system 12 and is therefore suitable as a reference point for adjusting a control and regulation of the steering angle adjustment using the analysis and control unit 10.

Whenever the previously defined zero point of an axial position of the steering linkage 2 relative to the housing 3 is present, a comparison is made between the current rotor position of the rotor of the electric motor 16 and the current axial position of the target 11, wherein the measurement signals of the temperature sensor 9 are evaluated at the same time and a thermal expansion of at least the steering linkage 2 can be determined on the basis of coefficients of thermal expansion stored in the analysis and control unit 10. By determining the thermal expansion of other components relevant to adjusting the steering angle, such as for the threaded spindle 14, the threaded nut 7, the housing 3 or the fork elements 5a, 5b, the operating adjustment of the actuator 1 can be performed more precisely. Such an adaptation consists essentially in taking into account a temperature-related deformation of the components in such a way that a target specification for a steering angle is adjusted to an actually existing steering angle of the vehicle wheels. In other words, temperature-related differences in component dimensions are compensated for by the control and analysis unit 10.

The control and analysis unit 10 is also designed to perform a comparison between the current rotor position of the rotor and the current axial position of the target 11 per rotor revolution and uses this to operate an actuator 1 to adjust the steering angle. As a result, temperature-related differences in component dimensions can be compensated for more precisely by the control and analysis unit 10.

According to the present example embodiment, the zero point of the rotor position sensor 6 and the linear sensor 8 is defined at a temperature of 20° C., for example. In other words, a reference point is determined, namely at which a specific rotor position of the rotor and a specific distance of the target 11 to a bracing point 23 of the steering linkage 2 on the threaded drive 4—shown here as a middle vertical line—are present. Since the component dimensions of all components of the rear axle steering system 12 and the actuator 1 are known, based on the respective material-specific coefficients of thermal expansion, at a temperature of 20° C. the following distances are known or are defined: a first distance 17 of a first point 22a of the first fork element 5a to the bracing point 23 of the steering linkage 2 on the threaded drive 4; a second distance 18 of a second point 22b of the second fork element 5b to the bracing point 23 of the steering linkage 2 on the threaded drive 4; a third distance 19 of the target 11 to the bracing point 23 of the steering linkage 2 on the threaded drive 4; a fourth distance 20 of a central axis 24 of the housing 3 to the bracing point 23 of the steering linkage 2 on the threaded drive 4; and a fifth distance 21 from the central axis 24 of the housing 3 to the target 11. Other distances can also be defined or determined. The more components are monitored by the control and analysis unit 10, the more precisely the vehicle can be steered or the actuation of the actuator 1 can be adapted more precisely. The central axis 24 of the housing 3 is arranged centrally between the fixed points 15 of the housing 3 and is shown as a vertical line.

If the temperature drops below 20° C. to 0° C., for example, during operation of the rear axle steering system 12 or the actuator 1, the steering linkage 2 and the other components of the actuator 1 contract. Since the steering linkage 2 is braced in the threaded drive 4, the first point 22a of the first fork element 5a shifts to the right in the direction of the threaded drive 4, so that the first distance 17 is reduced. The second point 22b of the second fork element 5b as well as the target 11 and the linear sensor 8 are also shifted to the left in the direction of the threaded drive 4, so that the second or third distance 18, 19 is also reduced. The linear sensor 8 thus detects a movement to the left, although the first fork element 5a moves to the right. Due to the smaller distance of the target 11, the temperature-related displacement of the target 11 in the direction of the threaded drive 4 is smaller than the displacement of the second point 22b of the second fork element 5b. Consequently, the displacement of the target 11 compensates for the displacement of the right-hand fork element 5b. This is taken into account by the control and analysis unit 10, wherein the control and analysis unit 10 controls the threaded drive 4 based on the thermal expansion of the respective components in such a way that the actual steering angle of the vehicle wheels corresponds to a target specification of the control and analysis unit 10.

If, during operation of the rear axle steering system 12 or the actuator 1, a temperature rises above 20° C., for example to 40° C., the steering linkage 2 and the other components of the actuator 1 expand. The first point 22a of the first fork element 5a shifts to the left and the second point 22b of the second fork element 5b as well as the target 11 and the linear sensor 8 shift in the opposite direction, to the right, so that the distances 17, 18, 19 increase, wherein the differences in length are dependent on the respective component dimensions.

The housing 3 also expands, starting from its center of gravity 24, and lengthens to the left and to the right. The expansion of the housing 3 depends on how the housing 3 is braced on the chassis of the vehicle or how many fixed points 15 are provided. As a result of the expansion of the housing 3 to the left, the threaded drive 4 fastened to the housing 3 and the linear sensor 8 are shifted to the left even before the thermal expansion of these components 4, 8 is taken into account. As a result, the first fork element 5*a* is also shifted to the left, so that the linear sensor 8 detects a quasi-movement of the steering linkage 2. The control and analysis unit 10 is designed to determine and take these relationships and length differences into account, with the threaded drive 4 being controlled based on the thermal expansion of the respective components in such a way that the actual steering angle of the vehicle wheels corresponds to a target specification of the control and analysis unit 10.

LIST OF REFERENCE SYMBOLS

1 Actuator
2 Steering linkage
3 Housing
4 Threaded drive
5*a*, 5*b* Fork element
6 Rotor position sensor
7 Threaded nut
8 Linear sensor
9 Temperature sensor
10 Control and analysis unit
11 Target
12 Rear axle steering system
13 Direction of displacement
14 Threaded spindle
15 Fixed point
16 Electric motor
17 First distance
18 Second distance
19 Third distance
20 Fourth distance
21 Fifth distance
22*a*, 22*b* Point
23 Bracing point of the steering linkage on the threaded drive
24 Central axis of the housing

The invention claimed is:

1. A method for steering a vehicle, the method comprising:
providing a rear axle steering system comprising:
an actuator having:
a steering linkage configured to be at least indirectly operable by a threaded drive, the steering linkage longitudinally displaceable within a chassis-fixed housing, and
a rotor position sensor configured for detecting a rotor position of a rotor of an electric motor configured for actuating the threaded drive, and
a linear sensor configured for detecting an axial position of a target arranged on the steering linkage, and
at least the rotor position and linear sensors configured to be connected to a control and analysis unit, and
a steering angle of wheels configured to be at least indirectly connected to the steering linkage is adjusted by the steering linkage,
comparing a rotor position of the rotor and an axial position of the target when there is a defined zero point of an axial position of the steering linkage relative to the housing and,
determining a thermal expansion of at least the steering linkage, and
operating the actuator via the control and analysis unit to adjust the steering angle according to the thermal expansion.

2. The method according to claim 1, wherein the determining of the thermal expansion of the at least the steering linkage is determined by detecting current temperature data via at least one temperature sensor.

3. The method according to claim 1, wherein the comparing of the rotor position of the rotor of the electric motor and the axial position of the target is accomplished by the control and analysis unit.

4. An actuator for a rear axle steering system of a vehicle having a steering linkage which is at least indirectly operable by a threaded drive and is longitudinally displaceable within a chassis-fixed housing, the actuator comprising:
a rotor position sensor for detecting a rotor position of a rotor of an electric motor configured for actuating the threaded drive, and
a linear sensor for detecting an axial position of a target arranged on the steering linkage, and
each of the rotor position and linear sensors connected to a control and analysis unit, and the control and analysis unit configured to: i) carry out a comparison between the rotor position of the rotor and the axial position of the target when there is a defined zero point of an axial position of the steering linkage relative to the housing and, ii) in consideration of a thermal expansion of at least the steering linkage, operate the actuator to adjust a steering angle.

5. The actuator according to claim 4, wherein the thermal expansion of at least the steering linkage is determined by detecting temperature data via at least one temperature sensor.

6. The actuator according to claim 5, wherein the at least one temperature sensor is integrated within the analysis and control unit.

7. The actuator according to claim 5, wherein the at least one temperature sensor is arranged on the linear sensor.

8. The actuator according to claim 5, wherein the at least one temperature sensor is an outside temperature sensor.

9. A vehicle comprising a rear axle steering system according to claim 4.

10. A rear axle steering system of a vehicle, the rear axle steering system comprising:
a steering linkage having a threaded spindle configured to move longitudinally via a threaded nut rotatably driven by an electric motor,
a rotor position sensor configured for detecting a rotor position of a rotor of the electric motor,
a linear sensor configured for detecting an axial position of a target arranged on the steering linkage, and
a control and analysis unit electronically connected to each of the rotor position and linear sensors, the control and analysis unit configured to: i) store at least one coefficient of thermal expansion for the steering linkage, and ii) utilize the at least one coefficient of thermal expansion to adjust a position of the steering linkage based on thermal expansion of the steering linkage.

11. The rear axle steering system of claim 10, further comprising a temperature sensor electronically connected to the control and analysis unit.

12. The rear axle steering system of claim 11, wherein the temperature sensor is arranged on the linear sensor.

13. The rear axle steering system of claim 11, wherein the temperature sensor is arranged on the electric motor.

14. The rear axle steering system of claim 10, wherein the target is arranged within an anti-rotation mechanism arranged to prevent rotation of the steering linkage about a longitudinal axis of the steering linkage.

15. The rear axle steering system of claim 10, wherein, to adjust a position of the steering linkage, the control and analysis unit utilizes a comparison of a rotor position of the rotor and the axial position of the target when there is a defined zero point of an axial position of the steering linkage.

16. The rear axle steering system of claim 10, further comprising a housing, and the steering linkage is longitudinally guided by the housing.

17. The rear axle steering system of claim 16, wherein the housing comprises a plurality of fixing points configured to attach the housing to a chassis of the vehicle.

18. The rear axle steering system of claim 16, further comprising first and second fork elements arranged at respective first and second ends of the steering linkage.

19. The rear axle steering system of claim 18, wherein the first and second fork elements are arranged outside of the housing.

* * * * *